(12) United States Patent
Wong et al.

(10) Patent No.: US 11,234,190 B2
(45) Date of Patent: Jan. 25, 2022

(54) WAKE UP SIGNAL IN THE SELECTED FORMAT FOR USE BY THE COMMUNICATIONS DEVICE

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/763,580

(22) PCT Filed: Nov. 14, 2018

(86) PCT No.: PCT/EP2018/081254
§ 371 (c)(1),
(2) Date: May 13, 2020

(87) PCT Pub. No.: WO2019/096858
PCT Pub. Date: May 23, 2019

(65) Prior Publication Data
US 2020/0367166 A1    Nov. 19, 2020

(30) Foreign Application Priority Data
Nov. 14, 2017 (EP) .................................. 17201751

(51) Int. Cl.
*H04W 52/02* (2009.01)
*H04W 4/70* (2018.01)
(Continued)

(52) U.S. Cl.
CPC ......... *H04W 52/0229* (2013.01); *H04W 4/70* (2018.02); *H04W 52/0216* (2013.01);
(Continued)

(58) Field of Classification Search
None
See application file for complete search history.

(56) References Cited

U.S. PATENT DOCUMENTS

2016/0270013 A1*  9/2016  Soriaga ................. H04L 1/0047
2017/0245319 A1*  8/2017  Yasukawa ........... H04W 52/028
(Continued)

FOREIGN PATENT DOCUMENTS

WO    2018/202718 A1    11/2018
WO    2019/030337 A1    2/2019

OTHER PUBLICATIONS

International Search Report and Written Opinion dated Feb. 12, 2019 for PCT/EP2018/081254 filed on Nov. 14, 2018, 8 pages.
(Continued)

*Primary Examiner* — Eunsook Choi
(74) *Attorney, Agent, or Firm* — Xsensus, LLP

(57) ABSTRACT

The method includes transmitting the wake-up-signal in the selected format for use by the communications device. An arrangement is therefore provided in which a format of a wake-up-signal can be selected in accordance with characteristics of a process performed by a receiver to detect the wake-up-signal in accordance with the selected format. Accordingly, the format of the wake-up-signal can be selected in accordance with most appropriate characteristics for detecting the wake-up-signal with respect to a timing of the paging occasions for which the wake-up-signal is being transmitted and other signals from which the communications device can synchronise with the infrastructure equipment.

19 Claims, 7 Drawing Sheets

GUS and WUS transmission

(51) Int. Cl.
*H04W 56/00* (2009.01)
*H04W 68/02* (2009.01)

(52) U.S. Cl.
CPC ..... *H04W 52/0219* (2013.01); *H04W 56/005* (2013.01); *H04W 68/025* (2013.01)

(56) References Cited

U.S. PATENT DOCUMENTS

| | | | | |
|---|---|---|---|---|
| 2019/0239189 | A1* | 8/2019 | Hwang | H04W 52/0229 |
| 2020/0029302 | A1* | 1/2020 | Cox | H04W 56/0015 |
| 2020/0053649 | A1* | 2/2020 | Yao | H04W 72/0406 |
| 2020/0163017 | A1* | 5/2020 | Priyanto | H04W 88/04 |
| 2020/0280919 | A1* | 9/2020 | Hoglund | H04W 52/0216 |
| 2021/0045060 | A1* | 2/2021 | Sui | H04W 76/28 |

OTHER PUBLICATIONS

Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.

Ericsson, "Reduced system acquisition time for MTC," 3GPP TSG-RAN WG1 Meeting #90bis, R1-1716995, Prague, Czech Republic, Oct. 9-13, 2017, pp. 1-7.

Ericsson, "Revised WID for Further Enhanced MTC for LTE," 3GPP TSG RAN Meeting #73, RP-161464, revision of RP-161321, New Orleans, USA, Sep. 19-22, 2016, 6 pages.

Holma., H. and Toskala., A. "LTE for UMTS-OFDMA and SC-FDMA Based Radio Access," ISBN 978-0-470-74547-2, Apr. 2009, p. 25-27.

Huawei and Hisilicon, "New WID on Further NB-IoT enhancements", 3GPP TSG RAN Meeting #75, RP-170852, Dubrovnik, Croatia, Mar. 6-9, 2017, 4 pages.

Huawei and Hisilicon, "Revised work item proposal: Enhancements of NB-IoT", 3GPP TSG RAN Meeting #73, RP-161901, revision of RP-161324, New Orleans, USA, Sep. 19-22, 2016, 7 pages.

Sequans Communications, "Discussion on wake-up signal for power consumption reduction for feNB-IoT," 3GPP TSG-RAN WG1 #89, R1-1709161, Hangzhou, China, May 15-19, 2017, 4 pages.

Sierra Wireless, "Idle Mode Power Efficiency Reduction," 3GPP TSG RAN WG1 Meeting #89, R1-1708311, Hangzhou, P.R. China, May 15-19, 2017, 6 pages.

Sony, "Power consumption evaluation of wake-up signal technique for efeMTC," 3GPP TSG RAN WG1 Meeting #89, R1-1708246, Hangzhou, China, May 15-19, 2017, 7 pages.

White Paper, "Coverage Analysis of LTE-M Category-M1," Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2017, pp. 1-20.

* cited by examiner eDRX and Paging Time Window

Accumulation of drifts

GUS and WUS transmission

Delay between MSS and WUS, $T_{MSS-WUS}$

WAKE UP SIGNAL IN THE SELECTED FORMAT FOR USE BY THE COMMUNICATIONS DEVICE

CROSS-REFERENCE TO RELATED APPLICATIONS

The present application is based on PCT filing PCT/EP2018/081254, filed Nov. 14, 2018, which claims priority to EP 17201751.9, filed Nov. 14, 2017, the entire contents of each are incorporated herein by reference.

BACKGROUND

Field of Disclosure

The present disclosure relates to infrastructure equipment and communications devices of wireless communications systems, wherein the communications devices are configured to operate in a discontinuous reception mode in order to reduce power consumption.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of communications devices associated with different traffic profiles gives rise to new challenges for efficiently handling communications in wireless telecommunications systems that need to be addressed, particularly, but not exclusively, in respect of low power devices.

SUMMARY OF THE DISCLOSURE

The present disclosure can help address or mitigate at least some of the issues discussed above as defined in the appended claims.

Embodiments of the present technique can provide a method of determining a format of a wake up signal, which can be performed by both an infrastructure equipment and a communications device. For example, the infrastructure equipment performs the method comprising detecting that downlink messages for the communications device should be transmitted by the infrastructure equipment in one or more of a plurality of temporally spaced paging occasions, and determining that a wake-up signal, WUS, should be transmitted by the infrastructure equipment to the communications device in advance of each of the one or more paging occasions which comprise the downlink messages for the communications device. The method further comprises determining a time since a most recent transmission of a signal which can be used by the communications device to re-synchronise with the infrastructure equipment, and in accordance The method further comprises determining a time since a most recent transmission of a signal which can be used by the communications device to re-synchronise with the infrastructure equipment, and in accordance with the determined time since a most recent transmission of a signal for re-synchronising, selecting a format for a wake up signal from one of a plurality of formats, each format providing a wake up signal with different physical characteristics for detection by the communications device. The method further includes transmitting the wake up signal in the selected format for use by the communications device.

Embodiments of the present technique can provide an arrangement in which a format of a wake up signal for transmission by an infrastructure equipment and reception by a communications device can be selected in accordance with characteristics of a process performed by a receiver to detect the wake up signal in accordance with the selected format. Accordingly, the format of the wake up signal can be selected in accordance with most appropriate characteristics for detecting the wake up signal with respect to a timing of the paging occasions for which the wake up signal is being transmitted and other signals from which the communications device can synchronise with the infrastructure equipment.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Advanced Wireless Communications System

Figure 1:
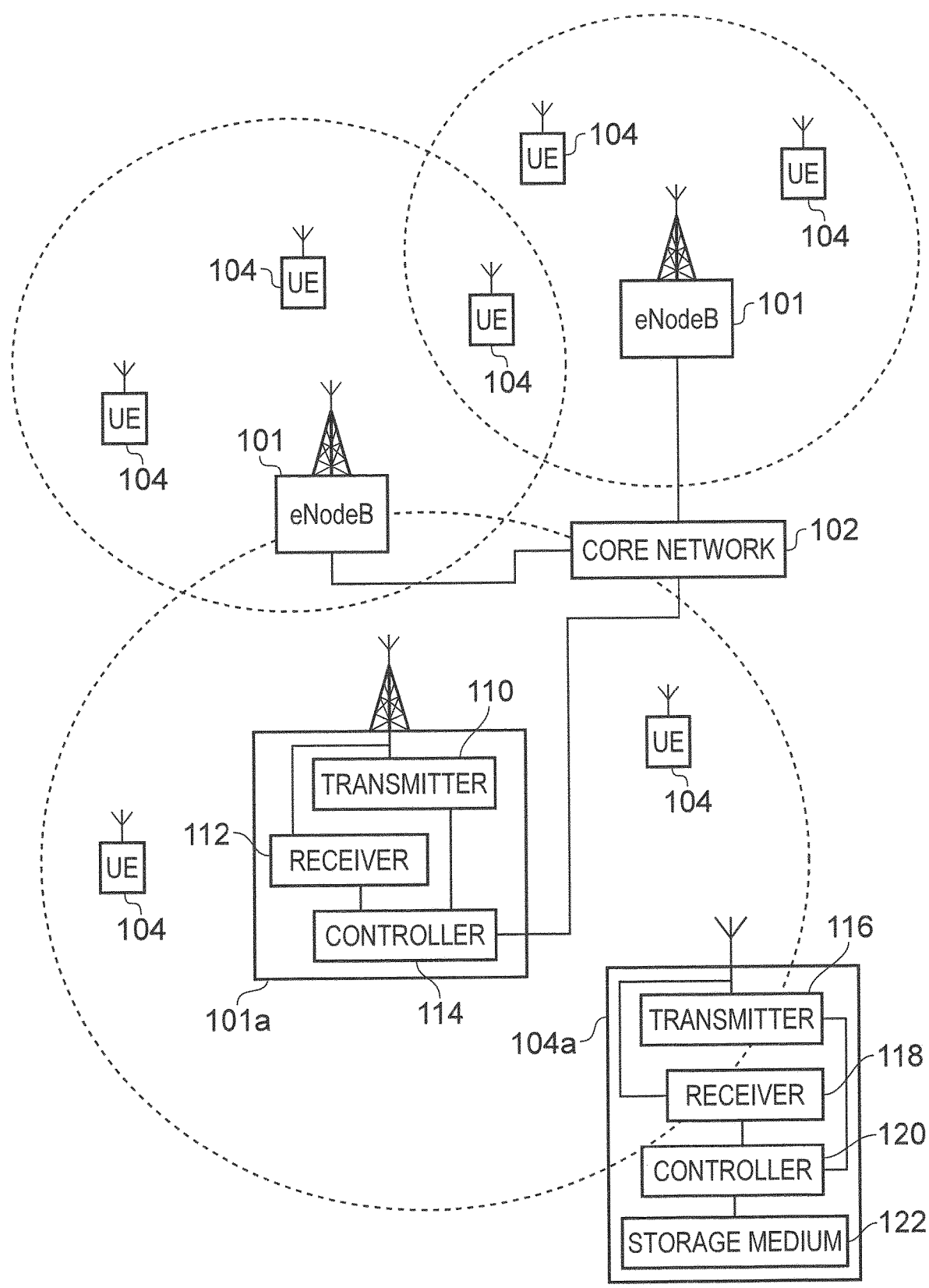
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [5]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface.

The core network 102 may also provide functionality including authentication, mobility management, charging and so on for the communications devices served by the network entity.

The mobile communications devices of FIG. 1 may also be referred to as communications terminals, user equipment (UE), communications devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) or 5G/New Radio (NR) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

In this example, the infrastructure equipment 101a comprises a transmitter 110 for transmission of wireless signals, a receiver 112 for reception of wireless signals and a controller 114 configured to control infrastructure equipment 1001a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 104 may provide the scheduling function for the base station.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The UE 104a also comprises a storage medium 122, such as a solid state memory or similar, for storing data. The transmitter 116, receiver 118 and storage medium 112 are controlled by a controller 120. In the embodiments of the present disclosure, the UE 104a is a communications device configured to operate using feMTC (Further Enhanced Machine Type Communications) or eNB-IoT (Enhanced Narrowband Internet of Things). The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the communications device 104a will in general comprise various other elements associated with its operating functionality, for example a power source, user interface, and so forth, but these are not shown in FIG. 1 in the interests of simplicity.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIG. 2.

Figure 2:
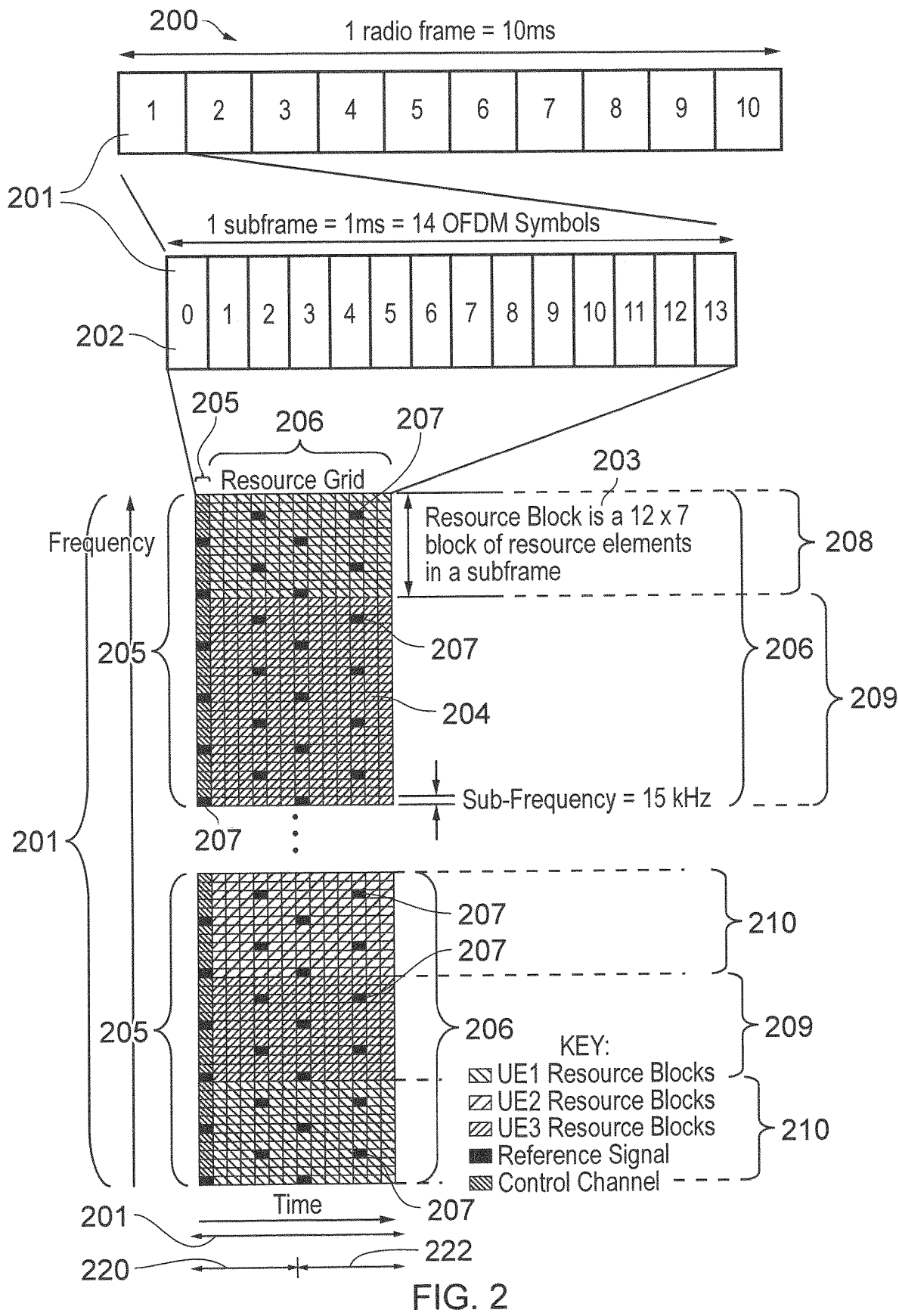
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data. The number of subcarriers varies between 72 subcarriers (1.4 MHz) and 1200 subcarriers (20 MHz). In some examples the subcarriers are grouped to form a scheduling blocks. A resource block (RB) can consist of 12 sub-carriers. A narrowband in MTC can consist of 6 RBs or 72 subcarriers. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The frame structure also contains primary synchronisation signals (PSS) and secondary synchronisation signals (SSS): not shown in FIG. 2. The PSS occupies the central 62 subcarriers of the $7^{th}$ OFDM symbol of the first subframe and the $7^{th}$ OFDM symbol of the $6^{th}$ subframe of the radio frame. The SSS occupies the central 62 subcarriers of the $6^{th}$ OFDM symbol of the first subframe and the central 62 subcarriers of the $6^{th}$ OFDM symbol of the $6^{th}$ subframe of the radio frame.

Before a terminal can use a cell provided by a base station, the terminal is expected to carry out a series of steps. For example, a terminal may be in a situation where it has not yet achieved synchronisation after a long DRX period or after having being switched on. A terminal would be expected to detect the cell and cell-ID using the Primary Synchronisation Signal (PSS) and Secondary Synchronisation Signal (SSS), and then receive the System Information (MIB) from the Physical Broadcast Channel (PBCH) and further System Information from the PDSCH. More specifically a terminal would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1-BR that is transmitted via the PDSCH. SIB1-BR contains scheduling information for acquiring the remaining System Information portions (other SIBs).

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

One application of MTC is to provide periodic reports, e.g. sensors, utility meters, where the reports or readings are transmitted infrequently, e.g. once every several hours or days. Hence in order to save battery power, such devices likely operate mostly in idle mode where they operate with long DRX cycles. When a MTC UE is put into long DRX it will lose synchronisation with the network and hence upon waking up from DRX (e.g. to monitor the Paging Occasion or perform a RACH), the UE needs to re-synchronise to the network and perform system acquisition (read the MIB and SIB). In the legacy system, the UE uses the legacy LTE PSS (Primary Synchronization Signal) and SSS (Secondary Synchronization Signal) to achieve synchronisation and thereafter, the UE acquires the PBCH and then SIB1-BR. For a UE operating in coverage enhanced mode, these re-synchronisation and system acquisition operations are notoriously slow as numerous repetitions are required to be able to decode the PBCH and PDSCH channels carrying the System Information. Example estimates of the expected acquisition times for the PSS/SSS, PBCH (MIB) and SIB1 are shown in Table 1, which is reproduced from [6], for a deep coverage scenario.

TABLE 1

Estimated 90% acquisition time at 164 dB MCL

| Channel | 90% Acquisition Time (ms) at 164 dB MCL |
| --- | --- |
| PSS/SSS | 850 |
| PBCH (MIB) | 250 |
| PDSCH (SIB1-BR) | 750 |

Figure 3:
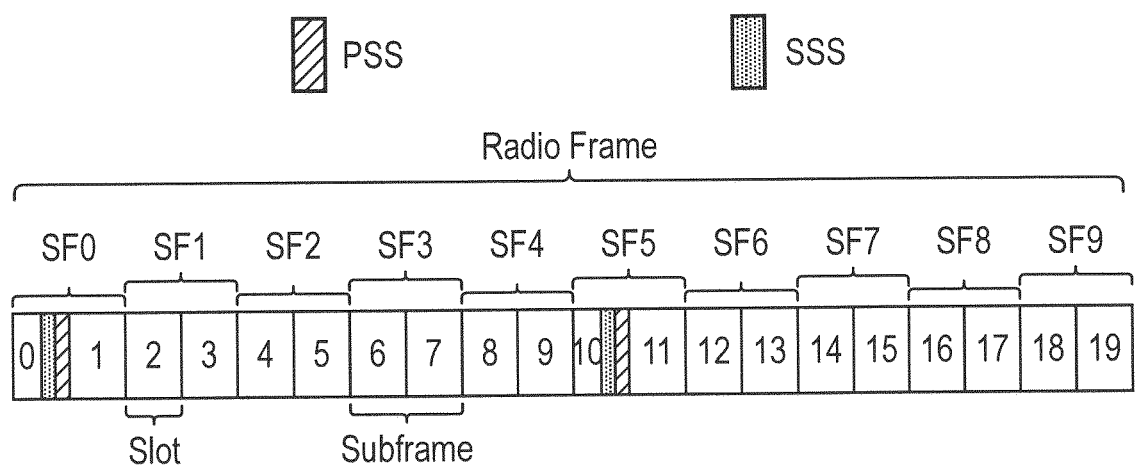
FIG. 3 schematically represents the transmission of the synchronisation signals in an FDD LTE system.

Legacy terminals (MTC terminals or otherwise) use the existing PSS/SSS which occupy only 1 OFDM symbol each and are transmitted sparsely; twice every radio frame. This is illustrated in FIG. 3 which represents the transmission of the synchronisation signals in an FDD LTE system, where it can be seen that the PSS and SSS each occupy a single OFDM symbol every 5 ms, where a radio frame is 10 ms. Here the PSS is transmitted in the last OFDM symbol of Slot 0 (Subframe 0) and Slot 10 (Subframe 5) whilst the SSS is transmitted in the second to last OFDM symbol of Slot 0 (Subframe 0) and Slot 10 (Subframe 5). Hence, additional synchronisation signals for MTC (MSS) are proposed for efeMTC to increase the density of available synchronisation signals so that the MTC UE can use them to shorten its time to re-synchronise to the network.

Figure 4:
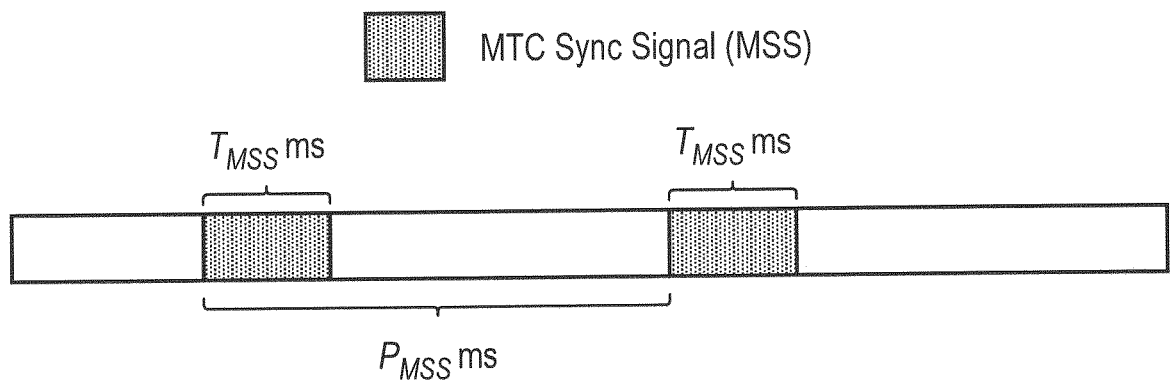
FIG. 4 illustrates an example of how additional MTC synchronisation signals (MSS) can be intermittently transmitted.

The MSS can be transmitted in a burst-like manner, i.e. it is transmitted densely for $T_{MSS}$ ms every $P_{MSS}$ ms [7], for example $T_{MSS}$ can be 10 to 20 ms and $P_{MSS}$ can be 100 ms to 3 seconds. The burst interval $T_{MSS}$ and periodicity $P_{MSS}$ is configurable thereby allowing the eNodeB to control the percentage of resources used for MSS. This is shown in FIG. 4.

Figure 5:
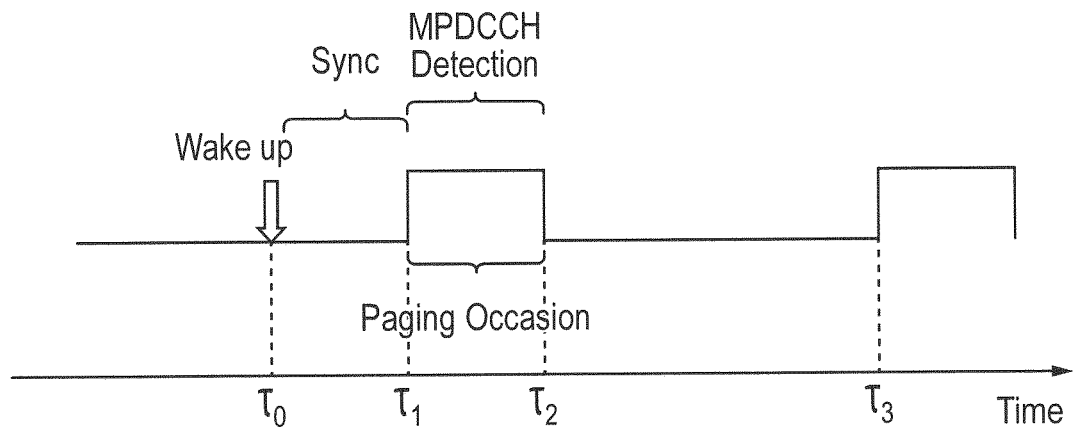
FIG. 5 provides a graphical illustration of a timing diagram representing a timing for transmitting a wake up signal before a paging occasion according to a previously proposed arrangement.

In previously proposed 3GPP systems, such as Rel-14 feMTC and Rel-14 eNB-IoT, the UE performs DRX in idle mode where the UE is required to monitor for possible paging messages at every Paging Occasion (PO). FIG. 5 shows a paging occasion cycle where the paging occasion starts at time $\tau_1$ and the UE is expected to blind detect for any potential MPDCCH (i.e. MPDCCH with a P-RNTI) between time $\tau_1$ and $\tau_2$. Typically the UE needs to wake up prior to the paging occasion, i.e. at time $\tau_0$ to perform synchronisation especially after a very long DRX where the UE loses synchronisation (where synchronisation can include fine adjustment to frequency and time tracking loops using CRS for when DRX cycles are short to re-synchronisation using PSS/SSS and CRS when DRX cycles are long and the frequency and timing of the UE is significantly offset relative to that of the eNodeB). If there is a paging message indication in the MPDCCH, the UE will decode the PDSCH carrying this paging message after time $\tau_2$. However, if there is no paging message indication in the MPDCCH for the UE, then the UE will go back to sleep until the next paging occasion at time $\tau_3$. It can be observed that if there is no paging message indication in the MPDCCH, the UE uses up a lot of energy waking up prior to the paging occasion and performing blind detection of MPDCCH. It is expected that paging does not occur very often for MTC devices and rarely (e.g. once a day) for utility meters and hence a lot of energy will be wasted performing unnecessary blind MPDCCH detections and overhearing paging messages that belong to other UEs.

As is well understood, various wireless telecommunications networks, such as the LTE-based network represented in FIG. 1 and the NR-based networks, may support different Radio Resource Control (RRC) modes for communications device s, typically including: (i) RRC idle mode (RRC_IDLE); and (ii) RRC connected mode (RRC_CONNECTED). When a communications device transmits data, RRC connected mode is generally used. The RRC idle mode, on the other hand, is for communications devices which are registered to the network (EMM-REGISTERED), but not currently in active communication (ECM-IDLE). Thus, generally speaking, in RRC connected mode a communications device is connected to a radio network access node (e.g. an LTE base station) in the sense of being able to exchange user plane data with the radio network access node. Conversely, in RRC idle mode a communications device is not connected to a radio network access node in the sense of not being able to communicate user plane data using the radio network access node. In idle mode the communications device may still receive some communications from base stations, for example reference signalling for cell reselection purposes and other broadcast signalling. The RRC connection setup procedure of going from RRC idle mode to RRC connected mode may be referred to as connecting to a cell/base station.

For a communications device in RRC idle mode the core network is aware that the communications device is present within the network, but the radio access network (RAN) part (comprising radio network infrastructure equipment such as the base stations 11 of FIG. 1 and/or the combined TRPs/CUs of FIG. 2) is not. The core network is aware of the location of idle mode communications devices at a paging tracking area level but not at the level of individual transceiver entities. The core network will generally assume a communications device is located within the tracking area(s) associated with a transceiver entity most recently used for communicating with the communications device, unless the communications device has since provided a specific tracking area update (TAU) to the network. (As is conventional, idle mode communications devices are typically required to send a TAU when they detect they have entered a different tracking area to allow the core network to keep track of their location.) Because the core network tracks communications devices at a tracking area level, it is generally not possible for the network infrastructure to know which specific transceiver entities (radio network node) to use when seeking to initiate contact with a communications device in idle mode. Consequently, and as is well known, when a core network is required to connect to an idle mode communications device a paging procedure is used.

In a typical currently deployed network, idle mode communications device s are configured to monitor for paging messages periodically. For communications devices operating in a discontinuous reception (DRX) mode this occurs when they wake up for their DRX awake time. Paging signals for a specific communications device are transmitted in defined frames (Paging Frames)/sub-frames (Paging Occasions) which for a given communications device may be derived from the International Mobile Subscriber Identifier (IMSI) of the communications device, as well as paging related DRX parameters established in system information transmitted within the network.

In a conventional system, a communications device thus receives and checks the contents of specific sub-frames (paging occasions) in specific frames (paging frames) to look for paging signalling. For example, in accordance with the standards set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent channel depending on implementation, e.g. on MPDCCH for MTC or for NB-IOT on NPDCCH) indicating the imminence of the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all communications device s (e.g. set at FFFE in hexa-decimal for the standard defined by 3GPP TS 36.321 version 13.5.0 Release 13 [7]). All communications devices check whether PDCCH at specific PFs/POs configured for their use include P-RNTI or not. If there is a PDSCH allocation addressed to the P-RNTI in the relevant subframe, the communications device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of communications device s, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14, a communications device in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the communications device might receive a paging message.

FIG. 5 schematically represents a timeline of a paging occasion for a communications device operating in a known wireless telecommunications system. In the example shown in FIG. 5, one paging occasion is shown and extends from time t1 to t2. As is conventional, paging occasions for a communications device will typically occur according to a regular repeating schedule having regard to the communications device's currently configured DRX cycle. Different communications devices may have different DRX cycle lengths, and so have different times between paging occasions. For a communications device having a relatively long DRX cycle/time between paging occasions, it is possible the communications device will to some extent lose synchronisation with the radio network infrastructure equipment of the telecommunications system between paging occasions. In this case it may be helpful for the communications device to wake up in advance of the paging occasion to allow it to synchronise to the wireless telecommunications system prior to the paging occasion. An example of this is schematically shown in FIG. 5 in which the communications device wakes up at time t0 so that it can synchronise with the wireless telecommunication system in the period between times t0 and t1 so that it is able to monitor/detect MPDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree of synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the communications device may become significantly offset relative to that of the radio network infrastructure).

Once the communications device has re-synchronised to the network, it will monitor MPDCCH to determine if there is a paging message, and if so will go on to decode the PDSCH carrying the paging message in the usual way. If there is no paging message for the communications device, the communications device will go back to sleep (low power mode) until the next paging occasion. For certain types of communications devices, such as MTC devices, it may be expected that paging will occur relatively rarely (e.g. once per day for a smart utility meter), and so in many cases the communications device may wake up and synchronise to the network to monitor MPDCCH by blind decoding for a potential DCI that may schedule a PDSCH containing a paging message when in fact there is no DCI or paging message for the communications device. This represents an undesirable "waste" of resources, for example battery power, for the communications device.

Wake-Up Signal (WUS)

Previously proposed approaches for eNB-IoT and feMTC in accordance with 3GPP release 15 share several common objectives, and one of these objectives is to reduce power consumption associated with monitoring for paging messages by introducing what is referred to as a wake-up signal (WUS) (e.g. of the type described in C. Hambeck, et al., "A 2.4 μW Wake-up Receiver for wireless sensor nodes with −71 dBm sensitivity", in IEEE Proceeding International Symposium of Circuits and Systems (ISCAS), 2011, pp. 534-537 [8], or of a type defined in a co-pending European patent application, with application number 17186065.3 [9]). The proposed WUS is carried on a new physical channel and is intended to allow communications devices to determine whether or not they need to actually decode MPDCCH in an upcoming paging occasion. That is to say, whereas in accordance with previously proposed techniques a communications device is required to decode MPDCCH during every paging occasion to determine if there is a paging message, and if so to decode PDSCH to determine if the paging message is addressed to the communications device, the WUS is instead intended to indicate to the communications device whether or not the next paging occasion contains a paging message that the communications device should decode. A WUS is transmitted at a pre-determined/derivable time in advance of a scheduled paging occasion such that a communications device knows when to seek to receive a WUS and may contain relatively little information so that it can be decoded quickly (as compared to the blind decoding needed for MPDCCH). For example, in some implementations the WUS may include a one-bit indication of whether or not there will be a paging message transmitted in the upcoming paging occasion. In other implementations the presence and absence of the WUS provide the indication. If the WUS indicates (e.g. using a bit or is detected to be present) the upcoming paging occasion does include a paging message, any communications devices for which that paging occasion applies may proceed to decode the paging message as normal to determine if the paging message is addressed to it. If the WUS (e.g. absence of a WUS) indicates the upcoming paging occasion does not include any paging message, any communications device for which that paging occasion applies can determine from this that it does not need to monitor for a paging message during the upcoming paging occasion, and so can, for example, return to a low power mode. In some implementations the WUS may include an identifier for a communications device that is going to be paged in the paging occasion. This identifier may identify an individual communications device or may identify a group of communications devices. The WUS may include multiple identifiers for multiple communications devices/groups. A communications device which determines the WUS is associated with an identifier that applies to it may proceed to decode the paging message as normal. Conversely, a communications device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 6:
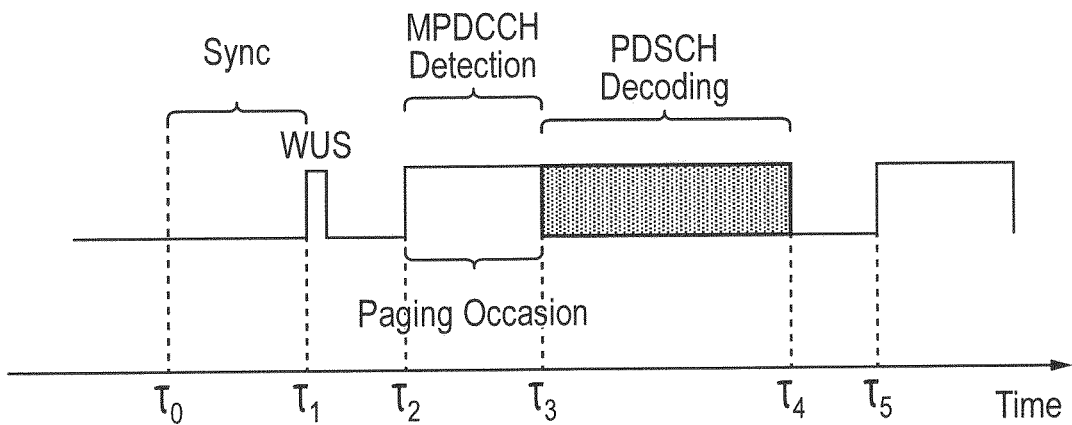
FIG. 6 provides a graphical illustration of another timing diagram representing a wake up signal transmitted with respect of a paging occasion according to a previously proposed arrangement.

FIG. 6 schematically represents a timeline for a paging occasion for a communications device operating in a wireless telecommunications system employing a WUS as proposed in association with 3GPP Release 15. In the example shown in FIG. 6, a paging occasion extends from time τ2 to τ3. As is conventional, the paging occasions will typically occur according to a regular repeating schedule having regard to the communications device's currently configured DRX cycle.

As schematically indicated in FIG. 6, a WUS is transmitted at a predetermined/derivable time τ1 in advance of the paging occasion to indicate there is a MPDCCH paging message transmission for a communications device indicated by an identifier associated with the WUS (the identifier could identify an individual communications device or a group of communications devices). The WUS can indicate that the UE should wake up in order to read the paging occasion.

If a communications device is configured for a long DRX cycle (i.e. a relatively long time between paging occasions), there may be a significant likelihood the communications device will lose synchronisation with the radio access network so that it is unable to decode WUS without first synchronising to the radio access network.

Figure 7:
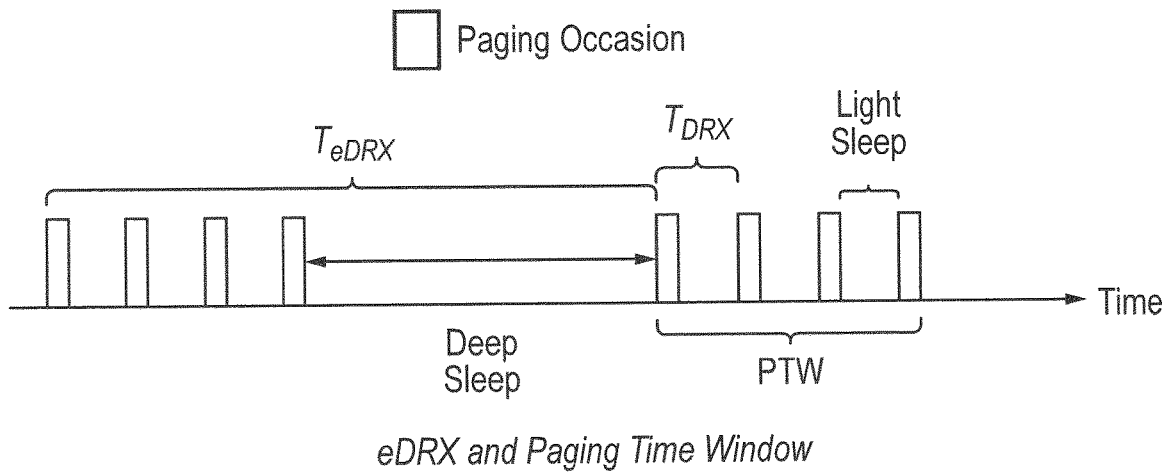
FIG. 7 provides a graphical illustration of a timing diagram representing a timing for paging occasions when a communications device is operating in an extended discontinuous transmission mode.

Extended DRX (eDRX) is introduced in Rd-13 for LTE to enable IoT devices to sleep longer thereby saving power, where the PO cycle is increased from 2.56 seconds to 2621.44 seconds (256 Hyper-frames) for eMTC and 10485.76 seconds (1024 Hyper-frames) for NB-IoT. For a PO cycle that is larger than 5.12 seconds, a Paging Time Window (PTW) is used. A PTW is shown in FIG. 7 which consists of a burst of POs (four POs in this example) with a DRX cycle of $T_{DRX}$, followed by deep sleep with a DRX cycle of $T_{eDRX}$. Within each DRX cycle in a PTW, the UE moves into light sleep and wakes up for its paging occasion.

Figure 8:
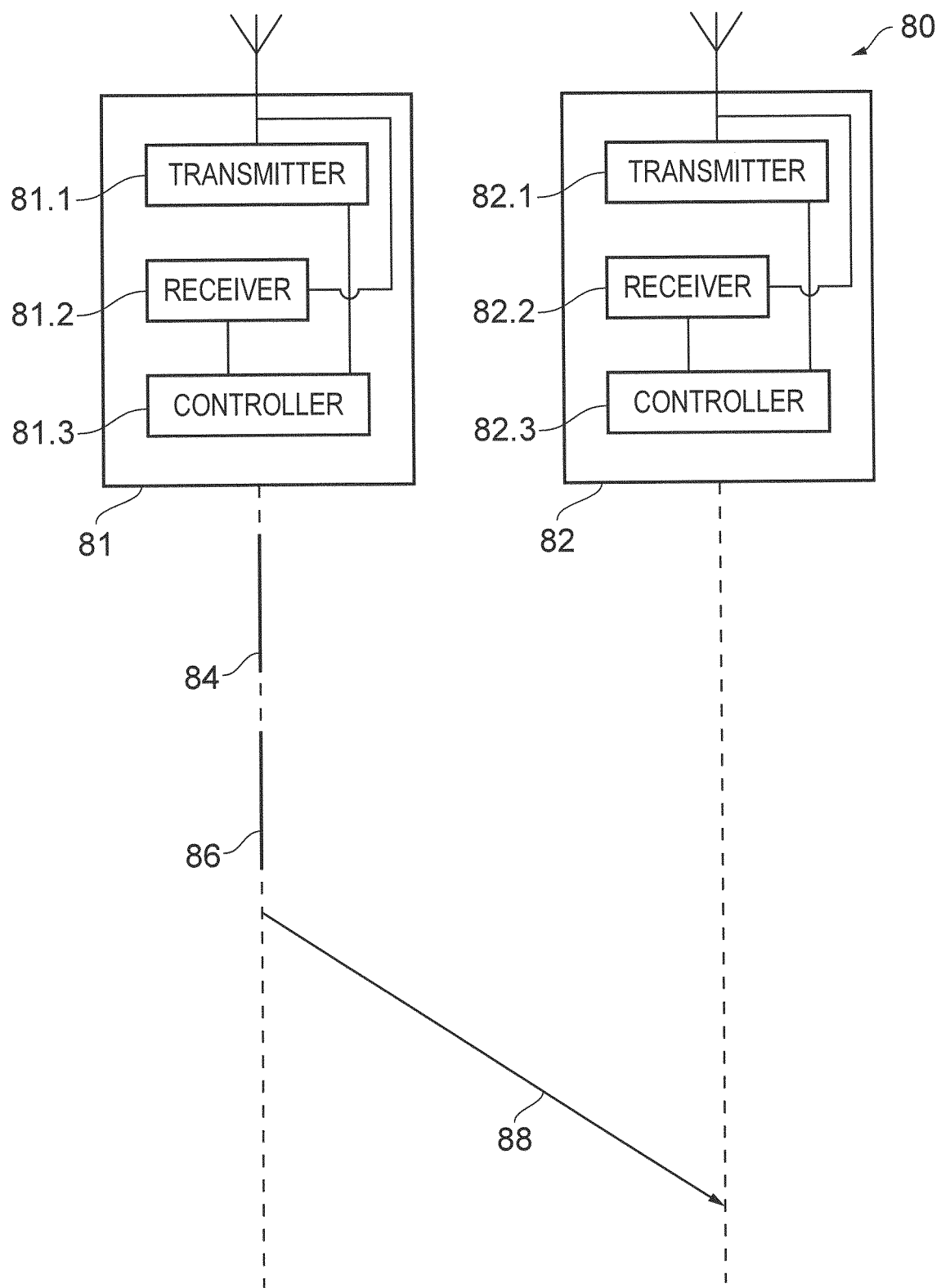
FIG. 8 is a part schematic block diagram part flow diagram illustrating an example embodiment of the present technique in which a format of a wake up signal is selected in accordance with physical characteristics of the wake up signal.

FIG. 8 shows a part schematic, part message flow diagram representation of a communications system 80 in accordance with embodiments of the present technique. The communications system 80 comprises an infrastructure equipment 81 and a communications device 82. Each of the infrastructure equipment 81 and communications device 82 comprise a transmitter (or transmitter circuitry) 81.1, 82.1, a receiver (or receiver circuitry) 81.2, 82.2 and a controller (or controller circuitry) 83.1, 83.2. Each of the controllers 83.1, 83.2 may be, for example, a microprocessor, a CPU, or a dedicated chipset, etc. It will be appreciated by those skilled in the art that, in arrangements of the present technique, the communications device 82 may not always include a transmitter 82.1, for example in scenarios where the communications device 82 is a low-power wearable device.

As will be explained below, embodiments of the present technique can provide an arrangement in which the controller 81.3 in the infrastructure equipment 81 is configured to detect 84 that downlink messages for the communications device 82 should be transmitted. The infrastructure equipment then first needs to locate the communications device by transmitting a paging message. The transmission of this paging message is pre-signalled by the infrastructure equipment in one or more of a plurality of temporally spaced paging occasions. To stop the communications device from waking up regularly to decode the pre-signal in the regular paging occasions, the infrastructure equipment is configured to determine that a wake-up signal, WUS, should be transmitted by the infrastructure equipment to the communications device in advance of each of the one or more paging occasions which comprise the downlink and/or pre-signal messages for the communications device. The controller circuitry 81.3 then determines 84 a time since a most recent transmission of a signal which can be used by the communications device to re-synchronise with the infrastructure equipment, and in accordance with the determined time since a most recent transmission of a signal for re-synchronising, to select 88 a format for a wake up signal from one of a plurality of formats, each format providing a wake up signal with different physical characteristics for detection by the communications device. Accordingly the controller circuitry 18.3 is configured in combination with the transmitter 81.1 to transmit the wake up signal 88 in the selected format for use by the communications device. In some arrangements, the wake up signal may be used by the communications device as a synchronisation signal for the communications device to re-synchronise its timing and/or frequency with the infrastructure equipment. However, in arrangements where the wake up signal is an RS-WUS (as described below), it will not be used by the communications device for any synchronisation. Those skilled in the art would appreciate that a communications system according to FIG. 8 can be equally applied to both RS-WUS and preamble based WUS implementations.

Figure 9:
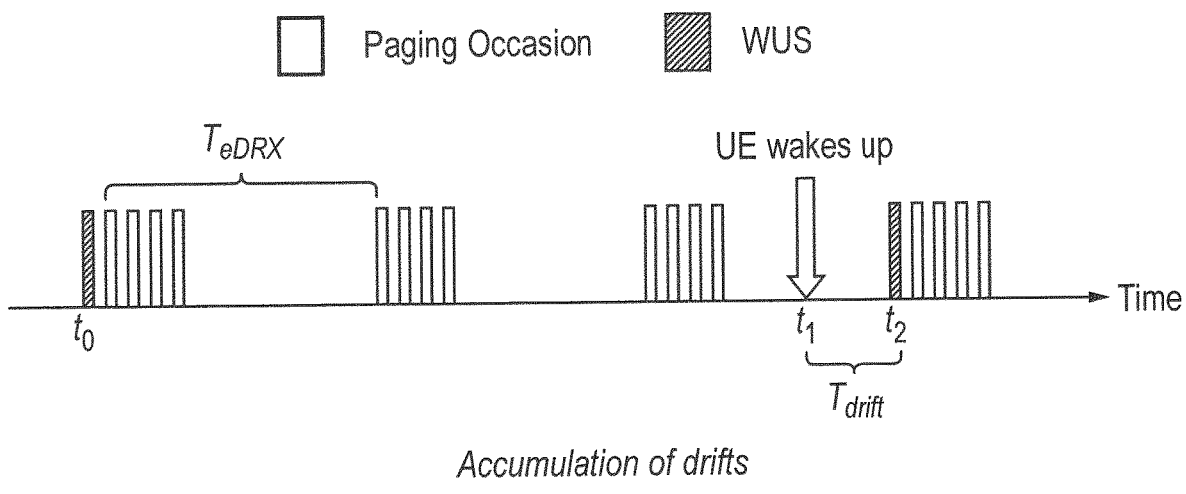
FIG. 9 provides a graphical illustration of a timing diagram representing a wake up signal transmitted with respect of a paging occasion illustrating a problem caused by synchronisation timing drift for which embodiments of the present technique find application.

During deep sleep, such as within an eDRX cycle, the UE may lose synchronisation with the network due to clock drifts in the UE. The drift will be worse in IoT devices which would use lower cost and less energy consuming Real Time Clocks (RTC) during deep sleep. The UE can re-synchronise using the WUS, but WUS may not be transmitted (e.g. in the case that there are no paging messages for any UE in the cell, no WUS is transmitted and UEs cannot re-synchronise to this non-existent signal), and hence the clock drift can accumulate across multiple POs or PTWs. For example in FIG. 9, a WUS is transmitted at time $t_0$ in which the UE achieves synchronisation with the network and no WUS is transmitted (due to no paging message for any UE) for 3 eDRX cycles until time $t_2$. The UE RTC will therefore have drifted across 3 eDRX cycles. The effect of this is that the UE needs to wake up early to compensate for the drift since the UE does not know where exactly the WUS would be transmitted.

Referring to FIG. 9 again, if the UE drifted by $T_{drift}$ ms between the time that the UE last synced with the network at time $t_0$ and the expectation of the WUS at time $t_2$, the UE needs to wake up at time $t_1$ which is at least $T_{drift}$ prior to the WUS at time $t_2$ in order to compensate for this drift. The effect is that when WUS signals are more infrequent, the timing drift at the UE will be greater and the UE will have to monitor for WUS over a larger timing window, which consumes more energy at the UE.

Embodiments of the present technique can provide an arrangement which addresses a loss of synchronisation resulting from a UE not having received a signal from the gNB for a period which is longer than a time in which the UE can lose synchronisation as a result of timing drift $T_{drift}$. Recognising that accumulated drifts in WUS impact on battery power consumption, co-pending European patent application number P113272EP disclosed an arrangement in which each PTW starts with a Go to sleep and wake Up Signal (GUS). A GUS is a Power Saving Signal similar to WUS but it is transmitted all the time (i.e. before every PTW) and indicates whether the UE should Go To Sleep or Wake Up [12]. Since it is always transmitted, it can be used to provide synchronisation at the start of each PTW, which also avoids the drift accumulation problem associated with WUS.

Figure 10:
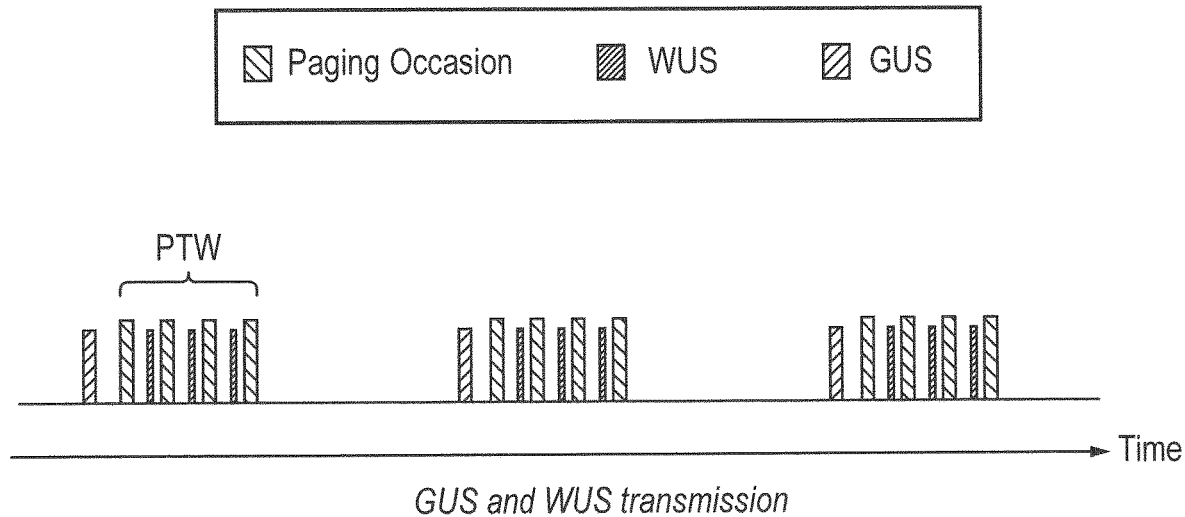
FIG. 10 provides a graphical illustration of a timing diagram representing transmission of a wake up signal, WUS, and go to sleep or wake up signal, GUS, with respect of paging occasions within a paging timing window with which embodiments of the present technique find application.

FIG. 10 provides an example timing diagram in which a GUS is transmitted at the start of every N PTW cycles and within a paging timing window (PTW) a WUS is used prior to every PO. In other words, the downlink messages should be transmitted during one or more of a plurality of paging time windows, each paging time window comprising one or more of the paging occasions, each of the paging time windows being spaced by a time greater than a predetermined threshold. Also, in other words, each WUS comprises an indication to the communications device of whether or not the paging occasion which the each WUS precedes comprises a downlink message for the communications device to decode. Additionally, one or more of the preamble signals are go-to-sleep or wake-up signals, GUSs. In other words, in these embodiments, the method comprises transmitting, by the infrastructure equipment, one of the GUSs immediately before every N of the paging time windows, where N is an integer which equals one or more.

As shown in FIG. 10 where N=1, i.e. a GUS is transmitted prior to every PTW and within the PTW a WUS may be transmitted prior to each PO. Although in FIG. 10 the WUS is shown to be transmitted prior to every PO, it should be appreciated that this is just an example and that in actual operation the WUS is only transmitted if there is a potential paging message for one or more UEs in the corresponding PO. Note that a WUS is not monitored by the UE prior to the first PO in the PTW since the GUS would indicate whether that PO is active (contains paging message for at least one UE) or inactive. Since a GUS is transmitted regardless of whether there is a potential paging message in the corresponding PO, this method would allow the use of the GUS as a synchronisation signal by the UE when it is deemed that the UE may have drifted beyond an intolerable threshold. These embodiments of the present technique also recognise that GUSs consume resources and by limiting them to the start of the PTWs, the resources used are minimised Since WUSs are only transmitted if a PO is active, then this method would optimise resources if the portion of active POs is small (which is expected for IoT services) compared to using GUSs. Furthermore the factor N can be used by the eNodeB to manage the resources used for GUS and the level of drift between eNodeB and UE (assuming the drift rate is known from specifications).

WUS Format Selection

Embodiments of the present technique can provide an arrangement in which one of a plurality of WUS formats is selected as a function of a time since the UE last received a signal to which it could synchronise in accordance with a relative ease with which the UE can detect and adjust its synchronisation timing to the selected signal.

In one example, a set of possible WUS signals comprises at least two WUS formats where the WUS format used depends on a delay between a closest monitored synchronisation signal, e.g. MSS (an additional synchronisation signal) or GUS, and the start of the WUS. Accordingly embodiments of the present technique can provide an arrangement in which a UE is provided with an improved facility for keeping synchronisation for communicating data to or form a wireless communications network. It has been previously proposed within 3GPP to use a combination of MSS and WUS [6], such that MSS is transmitted periodically to reduce the drift at the UE when using WUS.

In one example embodiment, two WUS formats are defined:
1) Preamble based WUS (P-WUS): WUS consists of a preamble sequence, such as a ZC-based sequence (ZC=Zadoff Chu) that can be used by the UE to achieve synchronisation, e.g. the WUS preamble in [10].
2) RS based WUS (RS-WUS): WUS consists of Reference Signals (RS) similar to those used in CRS or DMRS in LTE. The RS can be QPSK modulated.

According to physical properties of the P-WUS signal, the P-WUS can be detected by the UE without any prior synchronisation, that is, the UE does not need to achieve synchronisation by using other signals such as MSS or GUS in order to detect the P-WUS. RS-WUS on the other hand requires the UE to be synchronised prior to detecting it, that is, the UE would need to achieve synchronisation using other signals such as MSS or GUS. However, it is expected that in a coverage enhancement region (i.e. in the region where the coupling loss between the UE and eNB is between 0 and 20 dB greater than the coupling loss normally supported in the cell), P-WUS would require more repetitions than for RS-WUS due to P-WUS needing to also provide a synchronisation capability for the UE. Accordingly the physical properties of the P-WUS and the RS-WUS result in a process of detecting and therefore synchronising to these signals by a UE being different with an effect synchronising to the P-WUS does not require detecting other signals but takes longer to detect than the RS-WUS.

According to one example, if the delay between MSS (or GUS) and a WUS is $T_{MSS\text{-}WUS}$ then the WUS format is selected as follows:

If $T_{MSS\text{-}WUS} > T_{sync}$, then use P-WUS

Otherwise if $T_{MSS\text{-}WUS} \leq T_{sync}$, then use RS-WUS

Figure 11:
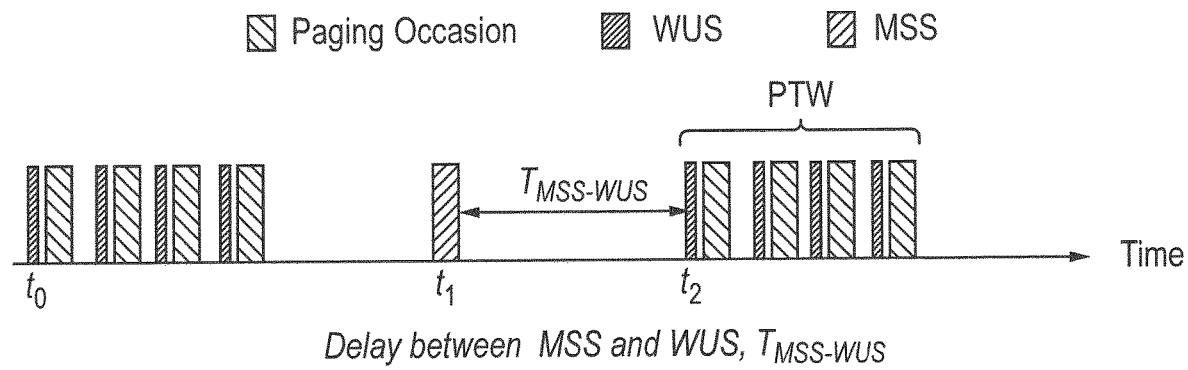
FIG. 11 provides a graphical illustration of a timing diagram representing transmission of a wake up signal, WUS, and additional synchronisation signals (MSS) with respect of paging occasions within a paging timing window in which a format of the WUS is selected in accordance with reception characteristics according an example embodiment of the present technique.

FIG. 11 provides a graphical representation of selecting either the P-WUS or RS-WUS as a function of $T_{MSS\text{-}WUS}$. $T_{MSS\text{-}WUS}$ is the time when the UE last had the opportunity to obtain synchronisation before it needs to detect for the WUS and if this time period is short, the UE clock would not have drifted beyond a point such that the UE loses synchronisation with the network, that is, $T_{sync}$ is the time in which the UE's drift does not cause it to lose synchronisation with the network. A rule of thumb is that if the drift is less than 10% of the symbol duration, the UE would not have lost synchronisation. The symbol period in LTE is 71.4 µs thereby a drift of more than 7.1 µs would be considered to be a loss of synchronisation. For an RTC (real time clock) with an accuracy of 20 ppm, $T_{sync}$ is estimated to be 0.355 seconds.

In an eDRX cycle, the UE will not go into deep sleep whilst in the DRX cycle, for example within a PTW. Instead the UE moves into light sleep, as shown in FIG. 7, since it needs to wake up more often. In deep sleep the UE uses a coarse clock such as an RTC clock and in light sleep the UE uses a finer clock such as LO XO (local oscillator, crystal oscillator) clock, which has a lower drift rate compared to that of the RTC. Therefore, in another embodiment, multiple thresholds are used where the threshold used depends on the type of DRX cycle the UE is in, that is:

If UE is in eDRX mode then
  If $T_{MSS\text{-}WUS} > T_{Deep\text{-}sync}$, then use P-WUS
  Otherwise if $T_{MSS\text{-}WUS} \leq T_{Deep\text{-}sync}$, then use RS-WUS
If UE is in DRX mode then
  If $T_{MSS\text{-}WUS} > T_{Light\text{-}sync}$, then use P-WUS Otherwise if $T_{MSS\text{-}WUS} \leq T_{Light\text{-}sync}$, then use RS-WUS Here $T_{Deep\text{-}sync} < T_{Light\text{-}sync}$ since in light sleep the clock drift rate is lower (e.g. 0.05 ppm).

In some embodiments, the WUS format is implicitly signalled by the PTW and MSS (or GUS) configurations. That is, the UE is configured with an eDRX cycle with specific PTW parameters. With the eDRX cycle configured, the UE is further configured with the location and periodicity of the MSS relative to that of the eDRX. The configuration of the location and periodicity/timing of the MSS then determines the WUS format (i.e. whether a P-WUS or RS-WUS precedes the PTW) because this would then determine a time between the MSS and WUS signals being detectable by the UE.

According to our co-pending European patent application under D Young & Co LLP's reference P113593EP, it is proposed [7] that the MSS carries some information bits. Hence in another embodiment, the MSS would indicate the next WUS format. For example if the $T_{MSS\text{-}WUS}$ is less than $T_{sync}$, the MSS can indicate whether the corresponding WUS uses P-WUS or RS-WUS. If $T_{MSS\text{-}WUS}$ is larger than the threshold $T_{sync}$, then the information bit carried by the MSS can either be ignored or is used to indicate other things.

The example embodiments described above have considered a case where a P-WUS or RS-WUS precedes a PTW (and can relate to the whole PTW). However, in other embodiments a WUS format can be select to precede an individual paging occasion, so that a selected one of a P-WUS or RS-WUS precedes an individual PO (whether within a PTW or not). For example, with reference to FIG. 8, each PO within the PTW can be controlled with either P-WUS or RS-WUS (depending on whether $T_{MSS\text{-}WUS} > T_{sync}$).

In some embodiments, the selection of the P-WUS or RS-WUS within a PTW depends on the time between MSS and the end of the PTW, $T_{MSS\text{-}PTW}$. That is to say, if $T_{MSS\text{-}PTW} > T_{sync}$, all of the PO within the PTW are preceded by P-WUS, else all PO are preceded by RS-WUS. These example embodiments allow the same type of WUS to be used in a PTW even for the case where some PO within the PTW satisfy the condition $T_{MSS\text{-}WUS} > T_{sync}$ and for other PO within the PTW $T_{MSS\text{-}WUS} \leq T_{sync}$.

Referring back to the example shown in FIG. 8 and as explained above, the infrastructure equipment 81 is configured to select a format of the WUS as a function of a time since the UE can last have received a signal from which it can derive synchronisation timing from the infrastructure equipment. According to the example embodiment the controller circuitry 81.3 in the infrastructure equipment 81 and the controller circuitry 82.3 can both determine the WUS format to be used. According to one example both the controllers 81.3, 82.3 are configured to compare a time since the most recent transmission of a signal for re-synchronising to a timing of the infrastructure equipment with one or more synchronisation thresholds, and in response to the comparison selecting one of the plurality of formats.

Each of the plurality of formats for the wake up signal provide the different physical characteristics for detecting the wake up signal, the different physical characteristics including a relative synchronisation error between a current timing of the communications device and a timing of the infrastructure equipment which can be tolerated before correction by the wake up signal. The different physical characteristics may include a relative time which the communications device needs to detect the wake up signal, or relative duration of the wake up signal. The relative time which the communications device needs to detect the wake up signal or relative duration of the wake up signal may be determined by a number of repetitions of the wake up signal before detection.

In some example embodiments the comparing the time since the most recent transmission of a signal for re-synchronising with one or more predetermined thresholds comprises comparing the time since the most recent transmission of a signal for re-synchronising with a synchronisation threshold, and the selecting comprises selecting the first format for the wake up signal if the time since the most recent transmission of a signal for re-synchronising is different to the synchronisation threshold, else selecting the second format for the wake up signal if the time since the most recent transmission is different to the synchronisation threshold.

In some example embodiments the synchronisation threshold may be determined in accordance with a type of discontinuous reception mode performed by the communications device in which a receiver of the communications device reduces power in which signals transmitted from the infrastructure equipment are not detected.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment in a wireless communications system comprising the infrastructure equipment and a communications device, wherein the method comprises
 detecting that downlink messages for the communications device should be transmitted by the infrastructure equipment in one or more of a plurality of temporally spaced paging occasions,
 determining that a wake-up signal, WUS, should be transmitted by the infrastructure equipment to the communications device in advance of each of the one or more paging occasions which comprise the downlink messages for the communications device,
 determining a time since a most recent transmission of a signal which can be used by the communications device to re-synchronise with the infrastructure equipment,
 in accordance with the determined time since a most recent transmission of a signal for re-synchronising, selecting a format for a wake up signal from one of a plurality of formats, each format providing a wake up signal with different physical characteristics for detection by the communications device, and
 transmitting the wake up signal in the selected format for use by the communications device.

Paragraph 2. A method according to Paragraph 1, wherein the wake up signal is transmitted in the selected format for use by the communications device as a synchronisation signal to re-synchronise a timing for receiving signals from the infrastructure equipment.

Paragraph 3. A method according to Paragraph 1 or Paragraph 2, wherein the selecting the format for the wake up signal from one of a plurality of formats comprises,
 comparing the time since the most recent transmission of a signal for re-synchronising to a timing of the infrastructure equipment with one or more synchronisation thresholds, and
 in response to the comparison selecting one of the plurality of formats.

Paragraph 4. A method according to Paragraph 1, 2 or 3, wherein each of the plurality of formats for the wake up signal provide the different physical characteristics for detecting the wake up signal, the different physical characteristics including a relative synchronisation error between a current timing of the communications device and a timing of the infrastructure equipment which can be tolerated by the communications device before correction by the wake up signal.

Paragraph 5. A method according to Paragraph 4, wherein the different physical characteristics include a relative duration of the wake up signal.

Paragraph 6. A method according to Paragraph 5, wherein the relative duration of the wake up signal is determined by a number of repetitions of the wake up signal before detection.

Paragraph 7. A method according to any of Paragraphs 1 to 6, wherein the plurality of formats for the wake up signal include a first format comprising a preamble sequence and a second format comprising one or more predetermined reference signals.

Paragraph 8. A method according to Paragraph 7, wherein the preamble sequence of the first format is based on a Zadoff Chu sequence.

Paragraph 9. A method according to Paragraphs 7 or 8, wherein the comparing the time since the most recent transmission of a signal for re-synchronising with one or more predetermined thresholds comprises comparing the time since the most recent transmission of a signal for re-synchronising with a synchronisation threshold, and the selecting comprises selecting the first format for the wake up signal if the time since the most recent transmission of a signal for re-synchronising is greater than the synchronisation threshold, else selecting the second format for the wake up signal if the time since the most recent transmission is less than the synchronisation threshold.

Paragraph 10. A method according to any of Paragraphs 3 to 9, wherein the synchronisation threshold is determined in accordance with a type of discontinuous reception mode configured for the communications device by the infrastructure equipment in which a receiver of the communications device reduces power in which signals transmitted from the infrastructure equipment are not detected.

Paragraph 11. A method according to Paragraph 10, comprising
 if the communications terminal is in a first discontinuous reception mode in which a receiver of the communications device reduces power consumption for a first duration and uses a clock for synchronisation with a first accuracy, the comparing the time since the most recent transmission of a signal for re-synchronising with one or more predetermined thresholds comprises comparing the time since the most recent transmission of a signal for re-synchronising to a first synchronisation time threshold, and the selecting comprises selecting a first format or a second format for the wake up signal in accordance with the comparison, else
 if the communications terminal is in a second discontinuous transmission mode in which a receiver reduces power consumption for a second duration which is less than the first duration and uses a clock for synchronisation with a second accuracy which is different to the first accuracy, the comparing the time since the most recent transmission of a signal for re-synchronising with one or more predetermined thresholds comprises comparing the time since the most recent transmission of a signal for re-synchronising to a second synchronisation time threshold, and the selecting comprises selecting a first format or a second format for the wake up signal in accordance with the comparison, the second synchronisation threshold being different to the first synchronisation threshold.

Paragraph 12. A method according to any of Paragraphs 1 to 11, comprising
- transmitting an additional synchronisation signal to the communications device to assist in maintaining a synchronisation of the communications device to a timing of the infrastructure equipment, a timing for transmitting the additional synchronisation signal being determined with respect to one or more of a plurality of temporally spaced paging occasions within a paging timing window, wherein the selecting the format for the wake up signal comprises selecting the format in accordance with a relative temporal position of the transmission of the additional synchronisation signal with respect to the paging timing window.

Paragraph 13. A method according to Paragraph 12, wherein the additional synchronisation signal is configured to carry one or more information bits for signalling to the communications device the format for the wake up signal which should be selected.

Paragraph 14. A method according to Paragraph 13, wherein the one or more information bits represent an indication of the format of the wake up signal which should be used in response to comparing the time since a most recent transmission of a signal for re-synchronising with the synchronisation threshold.

Paragraph 15. A method according to any of Paragraphs 12, 13 or 14, wherein the selecting the format of the wake up signal includes selecting the format of the wake up signal depending on a time between the transmission of the additional synchronisation signal and the end of the paging timing window.

Paragraph 16. A method according to Paragraph 15, wherein the comparing the time since the most recent transmission of a signal for re-synchronising to a timing of the infrastructure equipment with one or more predetermined thresholds, comprises
- comparing a time between the transmission of the additional synchronisation signal and an end of the paging timing window with a synchronisation timing threshold, and in response to the comparison the selecting one of the plurality of formats for the wake up signal comprises selecting the same format for the wake up signal for each of one or more wake up signals transmitted during the paging timing window.

Paragraph 17. A method according to any of Paragraphs 1 to 11, comprising
- transmitting a go-to-sleep or wake-up signals, GUSs, to assist in maintaining a synchronisation of the communications device to a timing of the infrastructure equipment, a timing for transmitting the GUS being determined with respect to the one or more of a plurality of temporally spaced paging occasions within a paging timing window, wherein the selecting the format for the wake up signal comprises selecting the format in accordance with a relative temporal position of the transmission of the GUS with respect to the paging timing window.

Paragraph 18. An infrastructure equipment for use in a wireless communications system comprising the infrastructure equipment and a communications device, the infrastructure equipment comprising transceiver circuitry and controller circuitry which are configured in combination
- to detect that downlink messages for the communications device should be transmitted by the infrastructure equipment in one or more of a plurality of temporally spaced paging occasions,
- to determine that a wake-up signal, WUS, should be transmitted by the infrastructure equipment to the communications device in advance of each of the one or more paging occasions which comprise the downlink messages for the communications device,
- to determine a time since a most recent transmission of a signal which can be used by the communications device to re-synchronise with the infrastructure equipment,
- in accordance with the determined time since a most recent transmission of a signal for re-synchronising, to select a format for a wake up signal from one of a plurality of formats, each format providing a wake up signal with different physical characteristics for detection by the communications device, and
- to transmit the wake up signal in the selected format for use by the communications device.

Paragraph 19. A method performed by a communications device with an infrastructure equipment within a wireless communications network, the method comprising
- preparing the receiver circuitry to receive downlink messages transmitted from the infrastructure equipment in one or more of a plurality of temporally spaced paging occasions,
- determining that a wake-up signal, WUS, will be transmitted by the infrastructure equipment to the communications device in advance of each of the one or more paging occasions which comprise the downlink messages,
- determining a time since a most recent reception of a signal from which the receiver circuitry and the controller circuitry can re-synchronise with the infrastructure equipment,
- in accordance with the determined time since a most recent reception of a signal for re-synchronising, determining a format for a wake up signal from one of a plurality of formats which will be used by the infrastructure equipment, each format providing a wake up signal with different physical characteristics for detection by the communications device, and
- receiving the wake up signal in the selected format.

Paragraph 20. A communications device for communicating with an infrastructure equipment within a wireless communications network, the communications device comprising receiver circuitry and controller circuitry, the controller circuitry being configured in combination with the receiver circuitry
- to prepare the receiver circuitry to receive downlink messages transmitted from the infrastructure equipment in one or more of a plurality of temporally spaced paging occasions,
- to determine that a wake-up signal, WUS, will be transmitted by the infrastructure equipment to the communications device in advance of each of the one or more paging occasions which comprise the downlink messages, to determine a time since a most recent reception of a signal from which the receiver circuitry and the controller circuitry can re-synchronise with the infrastructure equipment, in accordance with the determined time since a most recent reception of a signal for re-synchronising, to determine a format for a wake up signal from one of a plurality of formats which will be used by the infrastructure equipment, each format providing a wake up signal with different physical characteristics for detection by the communications device, and to receive the wake up signal in the selected format.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] White Paper "Coverage Analysis of LTE-M Category-M1" Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2016.
[7] R1-1716995, "Reduced System Acquisition Time for MTC," Ericsson 3GPP TSG-RAN WG1 Meeting #90bis, Prague, Czech Republic, Oct. 9-13, 2017.
[8] European patent application no. EP17169821.
[9] European patent application no. EP17186065.

What is claimed is:

1. A method of operating an infrastructure equipment in a wireless communications system comprising the infrastructure equipment and a communications device, wherein the method comprises detecting that downlink messages for the communications device should be transmitted by the infrastructure equipment in one or more of a plurality of temporally spaced paging occasions, determining that a wake-up signal, WUS, should be transmitted by the infrastructure equipment to the communications device in advance of each of the one or more paging occasions which comprise the downlink messages for the communications device, determining a time since a most recent transmission of a signal which can be used by the communications device to re-synchronise with the infrastructure equipment, in accordance with the determined time since a most recent transmission of a signal for re-synchronising, selecting a format for a wake up signal from one of a plurality of formats, each format providing a wake up signal with different physical characteristics for detection by the communications device, and transmitting the wake up signal in the selected format for use by the communications device.

2. A method according to claim 1, wherein the wake up signal is transmitted in the selected format for use by the communications device as a synchronisation signal to re-synchronise a timing for receiving signals from the infrastructure equipment.

3. A method according to claim 1, wherein the selecting the format for the wake up signal from one of a plurality of formats comprises, comparing the time since the most recent transmission of a signal for re-synchronising to a timing of the infrastructure equipment with one or more synchronisation thresholds, and in response to the comparison selecting one of the plurality of formats.

4. A method according to claim 1, wherein each of the plurality of formats for the wake up signal provide the different physical characteristics for detecting the wake up signal, the different physical characteristics including a relative synchronisation error between a current timing of the communications device and a timing of the infrastructure equipment which can be tolerated by the communications device before correction by the wake up signal.

5. A method according to claim 4, wherein the different physical characteristics include a relative duration of the wake up signal.

6. A method according to claim 5, wherein the relative duration of the wake up signal is determined by a number of repetitions of the wake up signal before detection.

7. A method according to claim 1, wherein the plurality of formats for the wake up signal include a first format comprising a preamble sequence and a second format comprising one or more predetermined reference signals.

8. A method according to claim 7, wherein the preamble sequence of the first format is based on a Zadoff Chu sequence.

9. A method according to claim 7, wherein the comparing the time since the most recent transmission of a signal for re-synchronising with one or more predetermined thresholds comprises comparing the time since the most recent transmission of a signal for re-synchronising with a synchronisation threshold, and the selecting comprises selecting the first format for the wake up signal if the time since the most recent transmission of a signal for re-synchronising is greater than the synchronisation threshold, else selecting the second format for the wake up signal if the time since the most recent transmission is less than the synchronisation threshold.

10. A method according to claim 3, wherein the synchronisation threshold is determined in accordance with a type of discontinuous reception mode configured for the communications device by the infrastructure equipment in which a receiver of the communications device reduces power in which signals transmitted from the infrastructure equipment are not detected.

11. A method according to claim 10, comprising
if the communications terminal is in a first discontinuous reception mode in which a receiver of the communications device reduces power consumption for a first duration and uses a clock for synchronisation with a first accuracy, the comparing the time since the most recent transmission of a signal for re-synchronising with one or more predetermined thresholds comprises comparing the time since the most recent transmission of a signal for re-synchronising to a first synchronisation time threshold, and the selecting comprises selecting a first format or a second format for the wake up signal in accordance with the comparison, else
if the communications terminal is in a second discontinuous transmission mode in which a receiver reduces power consumption for a second duration which is less than the first duration and uses a clock for synchronisation with a second accuracy which is different to the first accuracy, the comparing the time since the most recent transmission of a signal for re-synchronising with one or more predetermined thresholds comprises comparing the time since the most recent transmission of a signal for re-synchronising to a second synchronisation time threshold, and the selecting comprises selecting a first format or a second format for the wake up signal in accordance with the comparison, the second synchronisation threshold being different to the first synchronisation threshold.

12. A method according to claim 1, comprising
transmitting an additional synchronisation signal to the communications device to assist in maintaining a synchronisation of the communications device to a timing of the infrastructure equipment, a timing for transmitting the additional synchronisation signal being determined with respect to one or more of a plurality of temporally spaced paging occasions within a paging timing window, wherein the selecting the format for the wake up signal comprises selecting the format in accordance with a relative temporal position of the transmission of the additional synchronisation signal with respect to the paging timing window.

13. A method according to claim 12, wherein the additional synchronisation signal is configured to carry one or more information bits for signalling to the communications device the format for the wake up signal which should be selected.

14. A method according to claim 13, wherein the one or more information bits represent an indication of the format of the wake up signal which should be used in response to comparing the time since a most recent transmission of a signal for re-synchronising with the synchronisation threshold.

15. A method according to claim 12, wherein the selecting the format of the wake up signal includes selecting the format of the wake up signal depending on a time between the transmission of the additional synchronisation signal and the end of the paging timing window.

16. A method according to claim 15, wherein the comparing the time since the most recent transmission of a signal for re-synchronising to a timing of the infrastructure equipment with one or more predetermined thresholds, comprises
comparing a time between the transmission of the additional synchronisation signal and an end of the paging timing window with a synchronisation timing threshold, and
in response to the comparison the selecting one of the plurality of formats for the wake up signal comprises selecting the same format for the wake up signal for each of one or more wake up signals transmitted during the paging timing window.

17. A method according to claim 1, comprising
transmitting a go-to-sleep or wake-up signals, GUSs, to assist in maintaining a synchronisation of the communications device to a timing of the infrastructure equipment, a timing for transmitting the GUS being determined with respect the one or more of a plurality of temporally spaced paging occasions within a paging timing window, wherein the selecting the format for the wake up signal comprises selecting the format in accordance with a relative temporal position of the transmission of the GUS with respect to the paging timing window.

18. An infrastructure equipment for use in a wireless communications system comprising the infrastructure equipment and a communications device, the infrastructure equipment comprising transceiver circuitry and controller circuitry which are configured in combination
to detect that downlink messages for the communications device should be transmitted by the infrastructure equipment in one or more of a plurality of temporally spaced paging occasions,
to determine that a wake-up signal, WUS, should be transmitted by the infrastructure equipment to the communications device in advance of each of the one or more paging occasions which comprise the downlink messages for the communications device,
to determine a time since a most recent transmission of a signal which can be used by the communications device to re-synchronise with the infrastructure equipment,
in accordance with the determined time since a most recent transmission of a signal for re-synchronising, to select a format for a wake up signal from one of a plurality of formats, each format providing a wake up signal with different physical characteristics for detection by the communications device, and
to transmit the wake up signal in the selected format for use by the communications device.

19. A communications device for communicating with an infrastructure equipment within a wireless communications network, the communications device comprising receiver circuitry and controller circuitry, the controller circuitry being configured in combination with the receiver circuitry
- to prepare the receiver circuitry to receive downlink messages transmitted from the infrastructure equipment in one or more of a plurality of temporally spaced paging occasions,
- to determine that a wake-up signal, WUS, will be transmitted by the infrastructure equipment to the communications device in advance of each of the one or more paging occasions which comprise the downlink messages,
- to determine a time since a most recent reception of a signal from which the receiver circuitry and the controller circuitry can re-synchronise with the infrastructure equipment,
- in accordance with the determined time since a most recent reception of a signal for re-synchronising, to determine a format for a wake up signal from one of a plurality of formats which will be used by the infrastructure equipment, each format providing a wake up signal with different physical characteristics for detection by the communications device, and
- to receive the wake up signal in the selected format.

* * * * *